United States Patent [19]

Schlitt, III et al.

[11] 4,152,142

[45] May 1, 1979

[54] RECOVERY OF COPPER VALUES FROM IRON-CONTAINING ORE MATERIALS AS MINED AND SMELTED

[75] Inventors: William J. Schlitt, III; Samuel M. Polinsky, both of Salt Lake City, Utah

[73] Assignee: Kennecott Copper Corporation, New York City, N.Y.

[21] Appl. No.: 903,782

[22] Filed: May 8, 1978

Related U.S. Application Data

[63] Continuation-in-part of Ser. No. 772,735, Feb. 28, 1977, abandoned.

[51] Int. Cl.² .......................... C25C 1/12; C22B 15/00
[52] U.S. Cl. ..................................... 75/74; 75/101 R; 75/104; 75/109; 75/117; 204/108; 423/41
[58] Field of Search ............. 423/24, 27, 41, DIG. 14; 75/101 R, 104, 117, 109, 101 BE; 204/106, 108

[56] References Cited

U.S. PATENT DOCUMENTS

| | | | |
|---|---|---|---|
| 1,451,734 | 4/1923 | Irving | 75/104 |
| 1,602,795 | 10/1926 | Greenawalt | 204/108 |
| 1,798,255 | 3/1931 | Greenawalt | 204/108 |

OTHER PUBLICATIONS

Shelley, "Methods for Recovering Copper from Waste Copper Smelting Slags by Leaching" *Inst. Min & Met. Transactions* Sect. C, Mar. 1975, pp. C1–C4.
Flett "Solvent Extraction in Copper Hydrometallurgy: A Review" *Inst. Min. & Met. Transactions*" Sect. C, vol. 83, Mar. 1974, pp. C30, C31.

Primary Examiner—Brian Hearn
Attorney, Agent, or Firm—Mallinckrodt & Mallinckrodt

[57] ABSTRACT

A process for improving overall recovery of copper from an integrated mining and metallurgical processing operation by utilizing iron-containing copper ore materials as mined, such as low-grade copper ores and mine wastes, and crushed or granulated copper-containing slag obtained by smelting the higher-grade portions of such ore materials, involves the minign of such ore materials, the smelting of higher grade portions thereof, and the leaching of copper values from lower grade portions thereof with an aqueous, weakly acidic lixiviant to produce an acidic, ferric, effluent solution. The smelter slag is leached with the such effluent solution and copper values are recovered from the resulting pregnant solution. If desired, the barren solution may be recycled to the initial ore leaching step. By maintaining the pH of the acidic, ferric effluent solution from the initial leach within its normal range of about 1.9 to 3.0 for the slag leaching step, copper is selectively leached from the smelting slag while avoiding the usual precipitation of ferric salts and the formation of gelatinous slag decrepitation products. Moreover, ferric ion values in the acidic, ferric effluent solution from the initial leach are significantly reduced during laching of the smelter slag, thereby significantly increasing the efficiency of copper recovery in a subsequent step of either cementation of copper on metallic iron or electro-winning of copper.

9 Claims, 2 Drawing Figures

RECOVERY OF COPPER VALUES FROM IRON-CONTAINING ORE MATERIALS AS MINED AND SMELTED

RELATED APPLICATION

This is a continuation-in-part of our similarly entitled, copending Application Ser. No. 772,735, filed Feb. 28, 1977, now abandoned.

BACKGROUND OF THE INVENTION

Field: The invention pertains to processes for recovering copper from iron-containing, copper ore materials as mined and smelted.

Objective: It was a principal objective in the making of this invention to improve the recovery of copper values from an iron-containing, copper ore mining and smelting operation.

State of the Art: Slag wastes from copper smelting facilities are substantially homogeneous materials which typically contain from about 0.6% to about 1.0% copper by weight and sometimes more. Heretofore, attempts have been made to recover metallic values from the slag wastes. For example, U.S. Pat. No. 3,273,997 discloses a nonselective process for recovering soluble iron, lead, copper, calcium, silicon, zinc, and aluminum values contained in slag waste by mixing a warm, concentrated solution of a mineral acid with the crushed slag, separating the resulting solution from the solid, insoluble residue, and recovering the soluble metals from the solution. The temperature of the mixed solution and slag must be maintained at less than 175° F. to avoid formation of silica gel therein.

A method of leaching copper ores with a solution of ferric sulfate and sulfuric acid is disclosed in U.S. Pat. No. 2,563,623. It is taught that the total iron content of the leach solution must be maintained at a value less than 10 grams per liter and that the pH of the solution must be controlled at less than 2, to prevent plugging of the flow channels in the ore body with precipitated iron salts.

In U.S. Pat. No. 1,451,734, it is taught that the leaching action of an acidic, ferric-containing solution on copper ore can be increased by recycling to fresh ore after first passing the solution through a body of pyrite. The patent also teaches that this treatment causes excessive buildup of ferric ion in solution, so that passing of the resulting pregnant solution through a bed of manganese ore is required in order to reduce ferric iron content prior to copper recovery.

A publication by T. R. Shelley entitled "Possible Methods for Recovering Copper from Waste Copper Smelting Slags by Leaching", Institution of Mining and Metallurgy Transactions, Section C, 3/75, pp. C1–C4, describes this experimental leaching at Arya Mehr University of Technology, Teheran, Iran, of a blast-furnance smelter slag with a leaching solution prepared by dissolving iron powder in sulfuric acid, as compared with similar leaching of the slag with an ammonia-ammonium carbonate solution. Problems of gelification were encountered in the acidic ferric sulfate leaching and the ammonia-ammonium carbonate leach was recommended.

SUMMARY OF THE INVENTION

In accordance with the present invention, overall copper recovery from a deposit of iron-containing copper ore is significantly improved in an integrated operation by leaching with a weakly acidic, aqueous lixiviant copper values from lower grade portions of the ore as mined, e.g. from the mine waste dumps, and by leaching with the acidic, ferric effluent from such initial leaching step the copper-containing slags generated by smelting the higher grade portions of the ore, normally in the form of concentrates from usual milling procedures. The leach solution used in the initial leaching step has a pH in the range of about 2 to about 3.5, and produces a copper-bearing, acidic, ferric, effluent solution whose pH is ordinarily within the range of from 1.9 to 3.0.

The ferric iron content in the effluent solution is the active lixiviant used to leach copper values from the slag. Although the acid content of the effluent solution is not itself an active lixiviant in leaching copper values from the slag, the pH of the solution must be maintained within the specified range to avoid precipitation of ferric salts and the formation of gelatinous slag decrepitation products. These products commonly complicate the leach process by blocking the flow of solution through the slag or by coating the slag so as to reduce contact between slag and leach solution. Occasionally, depending mainly on the limestone content of the ore material being treated in the first leach step, the pH of the resulting effluent solution will be outside the specified range, whereupon an appropriate adjustment is made to bring the pH of the solution within the specified range prior to using the solution in the slag leaching step.

Even though the effluent solution obtained from leaching the low-grade ore materials contains a substantial amount of copper dissolved therein, the solution is capable of selectively leaching substantial amounts of additional copper from the waste slag. In addition, the high copper selectivity achieved in the slag leach avoids major problems which are otherwise encountered in separating copper from other metallic contaminants contained in the pregnant leach liquor obtained when concentrated acid solutions are used to leach the slag.

The slag leaching step is carried out under ambient conditions, and autoclaves or closed systems used in prior leaching processes are not required. Following the slag leach, the copper values contained in the pregnant leach solution are readily recovered therefrom either by cementation of copper on metallic iron or by electrowinning.

The pregnant leach solution resulting from the sequential leaching steps of this invention has a high copper content and a low ferric content. The high copper content is obtained due to the ability of the copper-containing solution from the first leach step to readily leach additional copper values from the waste slag. The low ferric content of the pregnant solution results from the consumption of ferric values as the copper values are leached from the slag. Conditions existing during slag leaching are such that there is essentially no regeneration of ferric values during the slag leach step to offset the consumption of ferric values.

Both the low ferric level and the high copper content of the pregnant leach solution coming from the second leach step have advantageous effects on the subsequent recovery of copper from such solution. The high copper content is beneficial with respect to both production level and unit costs, irrespective of the method used in recovering the copper from the pregnant leach solution. The low ferric content has a beneficial effect on the efficiency with which copper is recovered by cementation on iron. Ferric iron consumes metallic iron in an undesirable side reaction during cementation. Thus, reduction in the ferric content of the pregnant leach solution minimizes the unwanted consumption of metallic iron when the copper content thereof is recovered by cementation. The low ferric concentration is also advantageous when electrowinning is used to recover the copper content from the pregnant leach solution. Even when solvent extraction is employed prior to electrowinning, ferric ions, if present, are extracted along with copper. Any ferric ions contained in the copper-bearing solution being processed to recover the copper by electrowinning will hamper this operation.

THE DRAWINGS

Procedures typical of the invention and constituting the best mode presently contemplated of carrying it out in actual practice are illustrated in the accompanying drawings in which:

FIG. 1 is a flow diagram showing an integrated cyclic process in which low-grade pyritic copper sulfide ore materials as mined are leached with an acidic leach solution; the resulting effluent is used as the lixiviant solution in leaching copper-containing slag generated from smelting higher-grade portions of the ore as mined; the copper content of the pregnant leach solution coming from the slag leach is recovered by cementation; and the copper-depleted, acidic solution is recycled for repeated use in sequentially leaching the pyritic copper sulfide ore material and the slag; and FIG. 2, a flow diagram showing a similar integrated cyclic process in which the sequential leaching of the pyritic copper sulfide ore materials and the slag is the same as in FIG. 1, but copper is recovered from the pregnant leach solution by electrowinning preceded by known solvent extraction techniques, and the copper-depleted acidic leach solution from the extracting step is recycled for repeated use in sequentially leaching the pyritic ore material and the slag.

Alternatively, copper ore types other than the pyritic sulfide ore shown may be utilized in the initial leach step.

DETAILED DESCRIPTION OF THE PREFERRED EMBODIMENTS

Figure 1:
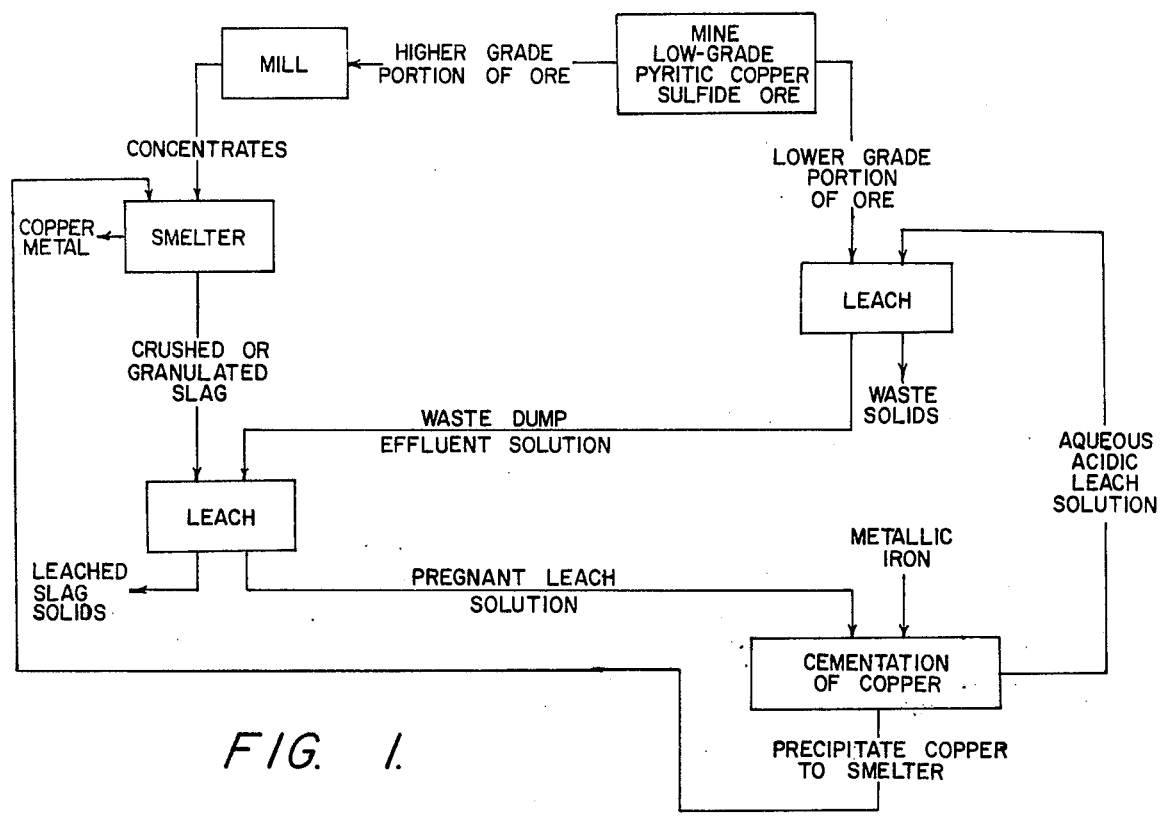

In accordance with the invention, overall copper recovery in a combined mining and smelting operation is improved by extracting copper from iron-containing copper ore materials as mined, e.g., pyritic sulfide ores and various oxide and silicate ores, and from copper-containing slags resulting from smelting of higher grade portions from such ore materials, by a sequential leaching operation. In one portion of the circuit the low-grade ore material is leached with an acidic, aqueous solution having a pH of from about 2 to 3.5 to produce an acidic, ferric iron, effluent solution containing copper values. The ferric-containing effluent solution emerging from the leaching of the ore material is used to selectively leach copper values from copper-containing, crushed or granulated slag which originated during smelting of the copper from the higher-grade materials being mined. The copper values contained in the pregnant leach solution coming from the slag leaching step are recovered either by cementation of copper on metallic iron or by electrowinning, often preceded by solvent extraction. The resulting copper-depleted, acidic, mother liquor is recycled to the sequential leaching operation or discharged as waste.

The ferric iron contained in the solution coming from the leaching of the low-grade material is the active lixiviant in the subsequent leaching of copper from the slag. As copper is leached from the slag, the ferric iron in the leach solution is reduced to the ferrous state. Because the slag can be leached for extended periods on the order of days or even weeks, a high degree of copper extraction can be achieved with very low ferric iron concentrations, for example about 1.0 gram per liter. In many cases, the chemical reactions occurring during the leaching of the low-grade ores in dumps or heaps have been found to generate ferric concentrations at about this level or a little more. Use of much higher ferric iron concentrations, as suggested by the prior art, to promote rapid copper extraction have actually proved to be detrimental to slag leaching. At these high levels, for example 10 to 20 grams per liter ferric iron, iron hydrolysis occurs and hydrolysis products coat the slag so that further copper extraction is minimal. In accordance with this invention, ferric iron concentration in the effluent solution is within the range of about 0.5 to about 3 grams per liter.

Another important consideration in the cyclic low-grade ore-slag leach operation is the pH of the leach solution in the slag leach step. This pH must be low enough to prevent precipitation of ferric salts and high enough to avoid formation of gelatinous slag decrepitation products, both of which would otherwise block the flow of leach solution through the slag. An operable range for the pH has been found to be about 1.9 to 3.0. As with the ferric concentrations, this pH range is the one usually found in solutions coming from the low-grade ore leaching step.

Temperature and pressure are not critical in either of the leach steps or in the subsequent copper recovery step. The process is effectively carried out at ambient temperatures and pressures, and the use of autoclaves or closed systems is not necessary.

In reverberatory slags, to which the present invention is particularly adapted, substantially all the copper contained therein is present as mixed sulfides in the chalcocite-bornite-chalcopyrite series. Careful mineralogical studies have shown that any chalcopyrite in the slag is highly deficient in sulfur and iron and is leached much more rapidly than the normal chalcopyrite found in naturally occurring minerals and ores. This may be one of the reasons that the copper-containing solution coming from the first leach step is so readily able to leach substantial amounts of additional copper values from the slag; however, applicants do not intend to be bound to such a theory.

The acidic, ferric-containing leach solution used in the slag leaching step is highly selective of copper. Most other constituents are present in combination with silica or alumina in the glassy phase of the slag and are, therefore, unaffected by the leach solution. One exception has been found to be zinc. Even though it is extracted by the leach solution, zinc does not hamper the subsequent recovery of copper from the leach solution.

A cyclic process for the sequential leaching of a low-grade, pyritic, copper sulfide ore material as mined and of a copper-containing slag obtained by smelting higher-grade portions of the mined material is shown in FIG. 1. The pyrite ore material, which can be low-grade ore, or, more commonly, the waste rock or overburden from the mining operation, is leached with an aqueous, acidic solution. The leach solution should have a pH within the range of about 2 to 3.5. As copper is being leached from the ore material by the leach solution, ferric iron is produced in a side reaction and accumulates in the leach solution. The pH of the effluent solution resulting from the first leach step will generally be slightly less than 3, and if it is not, the solution is adjusted to a pH of between 1.9 and 3.

This effluent is then utilized as the lixiviant solution in the second leach step, i.e., the leaching of the crushed or granulated slag. Even though the effluent solution from the first leach step may contain considerable amounts of dissolved copper, it has been found to be very effective in leaching substantial amounts of additional copper values from the slag in the second leach step. The ferric iron content of the effluent solution coming from the first step acts as the active lixiviant in the subsequent slag leaching step. As additional copper values are solubilized by the solution during the slag leaching, the ferric iron content of the solution is consumed, being reduced to ferrous iron.

The copper content of the pregnant leach solution obtained from the sequential leaching of the pyritic ore material and of the copper-containing slag is readily recovered using conventional cementation techniques. Ferric values consume iron as an undesirable side reaction during cementation. Thus, the depletion of the ferric iron content of the leach solution during the slag leaching step has a beneficial effect on the efficiency with which copper is recovered in the cementation step by significantly increasing the amount of copper recovered per unit of iron consumed. In addition, the increased copper content of the pregnant leach liquor increases the production level and decreases the unit cost in the cementation step.

The precipitate copper from the cementation step is preferably recycled to the smelter, as indicated in FIG. 1.

The spent, barren solution coming from the cementation step contains ferrous iron but essentially no ferric iron. It is acidic, having a pH of from about 2 to 3.5, and is, therefore, generally suitable for being recycled for repeated use in the sequential leaching steps of this process. As is well known, certain ores leached in the initial leaching step may require that some makeup acid be added to the barren solution being recycled.

Figure 2:
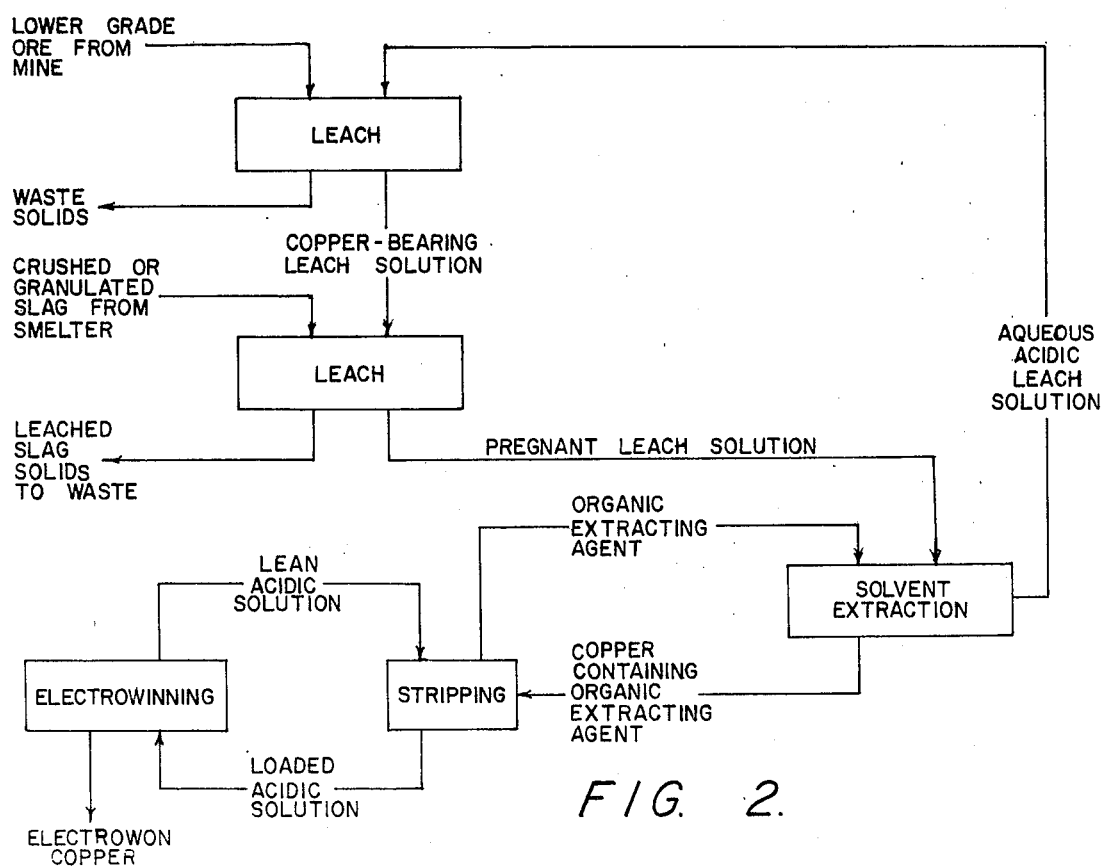

In FIG. 2, there is shown a process similar to the process of FIG. 1, in that an acidic leach solution having a pH of between about 2 and 3.5 is used to leach copper values from the low-grade copper-bearing minerals, e.g., sulfide ore, oxide ore or silicate ore in the first stage leach step, and the copper-bearing, ferric-containing, effluent solution from the first stage leach is then used to leach additional copper values from granulated or crushed slag derived from the smelting stage of the overall process. The pregnant leach solution from the second stage leach is, however, then subjected to conventional solvent extraction to produce a copper-containing extract and an acidic raffinate which contains iron, primarily in the ferrous state. The pH of the resulting raffinate is between about 2 and 2.5, and the raffinate is suitable for repeated use in the sequential leach steps of the process. Typical solvent extraction procedures which can be used in the present process are disclosed in Swanson, U.S. Pat. No. 3,224,873, which is incorporated herein by reference. Copper values are stripped from the extract produced in the solvent extraction step with an aqueous acidic stripping solution, as is fully disclosed in the Swanson patent referred to above. Copper is then electrowon from the copper-loaded stripping solution, and the lean acidic solution from the electrowinning step is recycled for repeated use as the stripping solution.

The high copper content of the pregnant leach solution resulting from the sequential leach steps results in increased unit recoveries of copper from the electrowinning apparatus. The low ferric iron is also advantageous when using electrowinning, with or without solvent extraction, to recover the copper values from the pregnant leach solution from the sequential leach steps. Even when solvent extraction precedes electrowinning of copper, ferric ions present in the pregnant leach solution are coextracted therefrom with the copper. Thus, either the extract from the solvent extraction or the pregnant solution itself is contaminated with ferric values which hampers the recovery of copper in subsequent recovery operations. By reducing the ferric content of the pregnant leach solution to a very low level, the problems encountered in the subsequent electrowinning process are greatly alleviated.

Whereas this invention is here illustrated and described with reference to particular embodiments presently contemplated as the best mode of carrying out the invention in actual practice, it is to be understood that various changes may be made in adapting the invention to different embodiments without departing from the broader, inventive concepts disclosed herein and comprehended by the claims that follow.

We claim:

1. In the recovery of metallic copper from a copper-sulfide ore deposit containing pyrite, the steps of (a) mining the ore deposit; (b) smelting the higher grade ore mined from said deposit to yield a smelter slag containing relatively little copper; (c) leaching with an acidic ferric sulfate solution, of pH between about 2 and 3.5, rejected lower grade portions of the mined ore materials containing pyrite and relatively litte copper to yield a copper-bearing, acidic, ferric sulfate solution; (d) grinding or granulating said smelter slag; (e) leaching the ground or granulated smelter slag with the copper-bearing, acidic, ferric sulfate solution from step (c), which has a pH of from about 1.9 to 3.0, to recover copper values from said slag and to minimize the presence of ferric ions in said solution; and (f) recovering metallic copper from the effluent leach solution of slag leaching step (e).

2. A process in accordance with claim 1, wherein the ferric iron concentration in the copper-bearing, acidic, ferric sulfate solution is within the range of about 0.5 to about 3.0 grams per liter.

3. An integrated process for improving overall recovery of copper values from a deposit of low-grade, iron-containing, copper ore materials comprising mining said ore materials; smelting higher grade portions of the mined ore materials to provide a slag containing relatively little copper; crushing or granulating said slag; leaching lower-grade portions of the mined ore material with an acidic, aqueous solution having a pH of between about 2 and 3.5, to produce an effluent solution having a pH of from about 1.9 to 3.0 and containing dissolved copper and ferrite iron values; separating said effluent solution from the so-leached ore material; leaching the crushed or granulated smelter slag with said effluent solution, thereby selectively leaching copper values from said slag without problems of iron hydrolysis or gel formation and, at the same time, beneficially reducing the level of ferric iron present in the solution; and recovering copper values from the resulting pregnant leach solution.

4. A process in accordance with claim 3, wherein the copper values are recovered from the resulting pregnant leach solution by contacting metallic iron with the pregnant leach solution, whereby copper is precipitated from the solution and replaced therein by iron; and precipitated copper is separated from the copper-depleted solution.

5. A process in accordance with claim 4, wherein the copper-depleted solution is recycled and used as the aqueous, acidic leach solution in the leaching of the lower grade portions of the mined ore material.

6. A process in accordance with claim 3, wherein the copper values are recovered from the pregnant leach solution by electrowinning.

7. A process in accordance with claim 6, wherein the electrowinning is preceded by contacting the pregnant leach solution with a liquid exchange medium which is substantially insoluble in said leach solution and which is capable of selectively extracting copper values therefrom; and wherein the aqueous raffinate solution is separated from the thereby copper-enriched, liquid exchange medium and copper values are stripped from said liquid exchange medium with an aqueous, acidic, stripping solution.

8. A process in accordance with claim 7, wherein the raffinate solution is recycled and used as the aqueous, acidic leach solution in the leaching of the lower grade portion of the mined ore material.

9. A process in accordance with claim 3, wherein the ferric iron concentration in the effluent solution is within the range of about 0.5 to about 3.0 grams per liter.

* * * * *